Nov. 4, 1969          J. E. McWILLIAMS          3,476,271
        APPARATUS FOR LOADING BAGGED MAIL FROM A LOADING
                    DOCK INTO A HIGHWAY VEHICLE
Filed March 5, 1968                              2 Sheets-Sheet 1
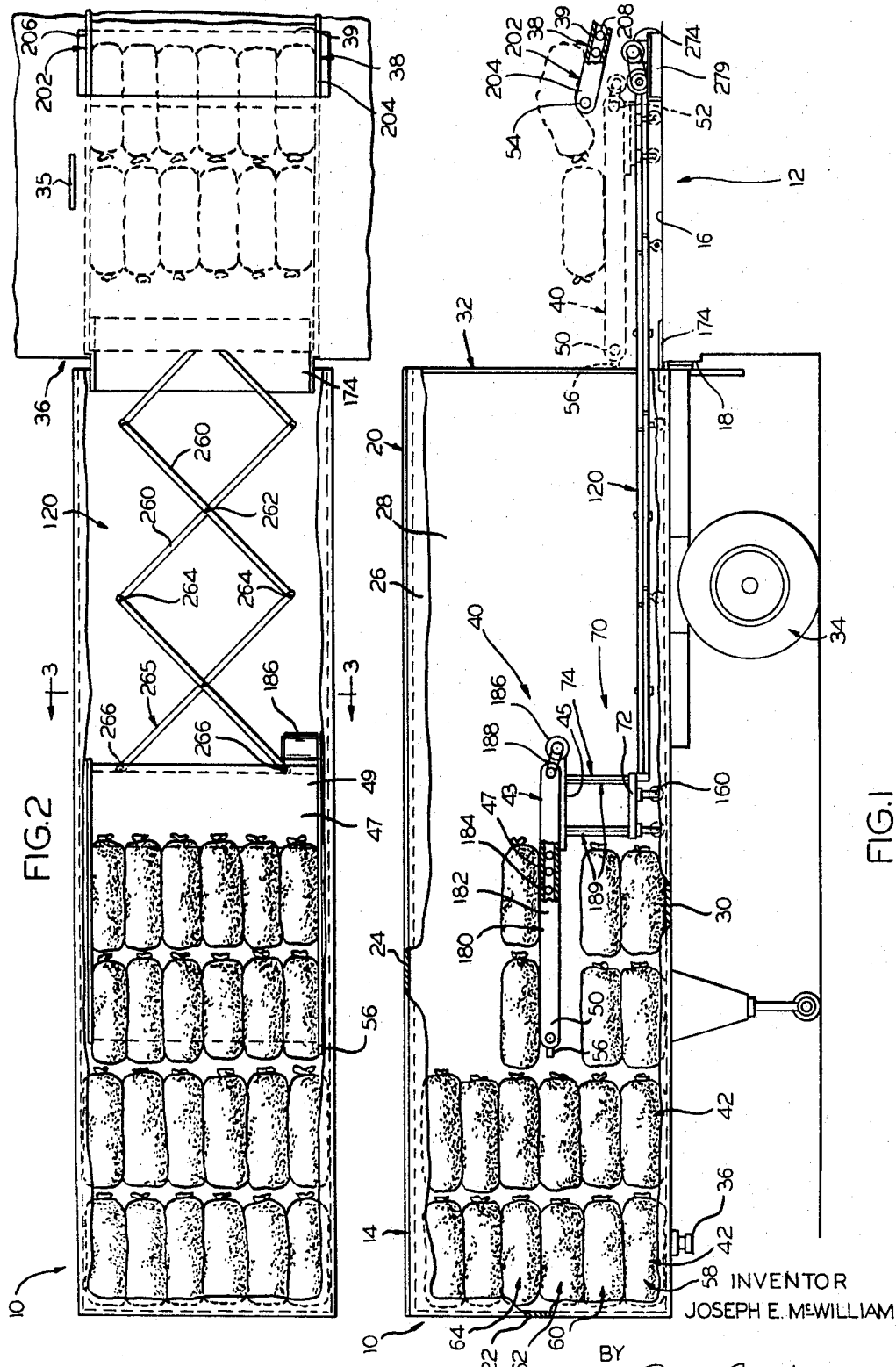

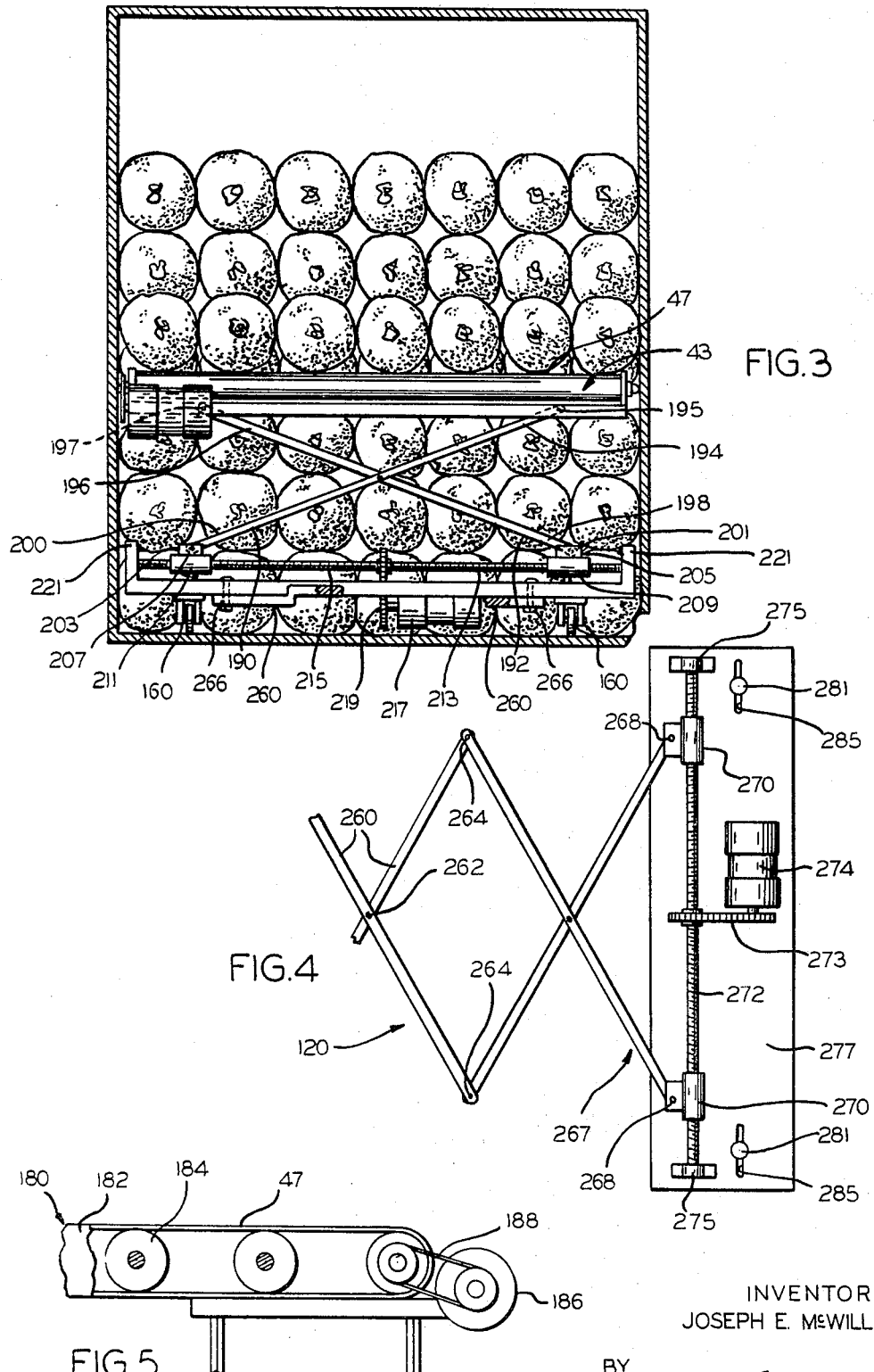

United States Patent Office 3,476,271
Patented Nov. 4, 1969

3,476,271
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Continuation-in-part of application Ser. No. 694,151, Dec. 28, 1967. This application Mar. 5, 1968, Ser. No. 710,514
Int. Cl. B65g 57/00, 67/04
U.S. Cl. 214—6        6 Claims

ABSTRACT OF THE DISCLOSURE

The invention relates to the loading of mail bags from a loading dock into an end loading highway vehicle, such as a truck or a trailer, to fully load the vehicle with stacks of mail bags in which the bags are compactly loaded into place in individual stack forming tiers without those performing the bag loading operation having to enter the vehicle. In practicing the invention, the loading dock at the post office or the like is provided with a conveyor on which out-going bags are placed and oriented in closely spaced tier form. Operating between the conveyor and the highway vehicle is a carriage that rides on the loading dock and vehicle floor and carries a vertically movable load support that receives the tier load without disturbing the orientation of the bags and brings the tier load into the vehicle loading area for discharge of the stack forming tier unit, and effects placement of the tier as part of a stack in the vehicle, again without disturbing the orientation of the bags. The carriage then returns to the conveyor for another tier load.

The carriage movements are controlled so that the individual tier loads are formed into vertical stacks of mail bags that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, and palleting of the bags in groups is avoided while still achieving uniform loading in tier form.

This application is a continuation-in-part of my application Ser. No. 694,151, filed Dec. 28, 1967.

This invention relates to a method and apparatus for loading bagged mail from a loading dock into a highway vehicle, and more particularly, to methods of and means for facilitating the handling of bagged mail in tiered groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18.00 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in a single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to the specifics of the arrangement shown in FIGURES 8 and 9 of my said application.

A principal object of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicels such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered load groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with parts being broken away, and the mail bag tier carrying carriage being shown in its load receiving position in its dashed line position while its full line position shows one of the load discharging positions thereof;

FIGURE 2 is a plan view of the apparatus shown in FIGURE 1, with the suspended carriage being shown in its load unit receiving position;

FIGURE 3 is a cross-sectional view substantially along line 3—3 of FIGURE 2, better illustrating the mechanism for vertically shifting the carriage load support;

FIGURE 4 is a fragmental plan view of the mechanism for moving the carriage forwardly and rearwardly of the vehicle to be loaded; and FIGURE 5 is a fragmental side elevational view of the carriage supported conveyor at its load receiving end, with parts broken away.

However, it is to be distinctly understood that the specific embodiment of the invention illustrated is supplied primarily to comply with the requirements of the Patent Code, and that the invention may have other embodiments.

GENERAL DESCRIPTION

Reference numeral 10 of FIGURE 1 generally indicates one embodiment of the present invention that incorporates the basic approach of my said application Ser No. 694,151 for loading mail bags from a loading dock 12 into an end loading vehicle 14, which has been illustrated as being in the form of the familiar semi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor 38 and a mail bag tier conveying carriage or carrier 40, which receives the mail bags accumulated in tier form on conveyor 38, transports them into the vehicle 14 and discharges them in tier form to form mail bag stacks 42.

Under ordinary circumstances, the loading dock 12 is located at a post office or the like where loaded mail bags are processed for shipment to their destinations, and as indicated in FIGURE 2, the conveyor 38 and the carriage 40 are longitudinally aligned with the vehicle 14 (in the loading position of the vehicle) and have a width transversely thereof to accommodate enough mail bags 44 laid side by side in a row to form one complete tier 46 of a stack 42, such that when the tier is placed within the vehicle 14, it will extend substantially from one side wall 26 to the other side wall 28 as indicated in FIGURE 2. Conveyor 38 is in the form of conveyor belt 39 defining an upwardly facing load supporting surface 41 on which the bags 44 are placed, which surface, at least at the lower, loading end (not shown) of conveyor 38, is at an easy reach height above surface 16, such as two to three feet high. Carriage 40 carries a load support in the form of conveyor 43 supported by vertically movable platform 45, which conveyor 43 is in the form of a conveyor belt 47 defining load support surface 49.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and carriage 40 including its conveyor 43 are arranged so that these pieces of apparatus are operated without anyone having to go into the vehicle 14, as will be hereinafter described in connection with the embodiment of the invention illustrated in the drawings. For this purpose, the controls may be of the push button type applied to suitable control panel 35 and may be of any suitable electric and/or electronic type that will serve the purpose.

In the specific form of FIGURES 1–5, the carriage 40 is in the form of a wheeled frame 70 that rides on the floor 30 of vehicle 14 as well as on loading dock 12, and is actuated by a lazy tong linkage generally indicated at 120.

To practice my invention, after the vehicle 14 is positioned as shown in FIGURES 1 and 2 for loading (assuming it is empty), and the bags to be shipped are disposed, for instance in a pile or piles adjacent the conveyor 38, the worker or workers in the area of conveyor 38 pick up and position enough of the individual bags 44 to form one or more tiers 46 (of six to eight bags in a tier) on the belt 39 of conveyor 38 in which, in accordance with the procedure contemplated by this embodiment of the invention, the bags of each tier 46 are placed in closely spaced side by side relation and extend longitudinally of the conveyor 38 and vehicle 14.

When one or more tiers 46 have been applied to conveyor 38 in the manner indicated (which tiers are termed a "partial transport vehicle load depth unit" in the appended claims), the carriage 40 is positioned as shown in dashed lines of FIGURE 1, and the conveyor 38 is actuated to deposit simultaneously all the bags 44 forming the first tier 46 on the carriage conveyor 43. The carriage conveyor 43 is simultaneously actuated to move the first tier down to a position adjacent its forward end 50 so that it can receive the second tier, it being noted that the rear end 52 of the conveyor 43 is disposed in load receiving relation with respect to the forward end 54 of the conveyor 38; the second tier is then similarly applied to conveyor 43.

The carriage 40 is then actuated to move same from the dashed line position of FIGURE 1 into the vehicle 14 where it moves toward the front wall 22 of the vehicle to start the first stack of mail bags. Assuming that the vehicle 14 is completely empty, the carriage 40 moves forwardly of the vehicle 14 until its forward end 50 engages the wall 22, which actuates a suitable limit switch arrangement such as that indicated at 56 to stop the forward movement of the carriage 40 and actuate conveyor 43 as well as reverse the movement of the carriage 40 and actuate conveyor 43 as well as reverse the movement of the carriage 40 in such a manner that as the carriage 40 moves rearwardly of the vehicle 14, the first tier 46 of bags 44 is conveyed forwardly at a similar speed (for a net speed of zero relative to vehicle 14), and is dropped onto the floor 30 of the vehicle adjacent the end wall 22 in the position indicated at 58.

Rearward movement of the carriage 40 is then stopped and the conveyor 43 is then actuated to move up to its forward end 50 the next tier 46 of bags 44, whereupon the carriage 40 is again advanced toward forward wall 22 until limit switch 56 is actuated which again stops forward movement of the carriage 40 and actuates simultaneous operation of conveyor 43 and rearward movement of carriage 40 to discharge the next tier of bags (in the manner indicated above) where indicated at 60.

The carriage 40 is then returned to the dashed line position of FIGURE 1 to receive the next two tiers 46 of mail bags 44, which can be formed on to the conveyor 38 while the carriage 40 is operating in the manner that has just been described. These next two tiers are then unloaded in a similar manner where indicated at 62 and 64, respectively, the carriage conveyor 43 being elevated as required to place the latter tiers on top of those already in place.

The next two tiers are stacked similarly to form the completed stack 42 adjacent the wall 22, after which the stacking process is repeated to form the next adjacent stack 42, as indicated by the solid line positioning of the carriage 40. This process is repeated until the stacks 42 have been formed the length of vehicle 14, after which the vehicle open end 32 is secured in the usual manner and the vehicle 14 driven off to be replaced by a similar vehicle 14 to be loaded.

The handling of the bags in moving them from the conveyor 38 to their respective positions in the vehicle 14 is thus carried out after having made a single orientation of the bag as to the position it is to take in a particular stack forming tier, and without having to drop the bag over the 24 inch limitation provided for by Post Office regulations.

From the description so far there are several important features to be observed. Note for one thing that the bags 44 are properly oriented in their tiers 46 by their application to the conevyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14, and palletizing of the individual tiers 14 is unecessary.

In the specific arrangement of FIGURES 1–5, the carriage 40 is in the form of a vehicle 70 including wheeled frame 72 which supports the platform 45 and conveyor 43 through a suitable cross lever type elevating mechanism generally indicated at 74.

Wheeled frame 72 of carriage 40 rides on casters 160, with carriage 40 in its cycling movements within the vehicle 14 and on the loading dock being guided by the operatioin of lazy tong linkage 120. Applied between the loading dock 12 and the vehicle floor 30 is a suitable bridge plate 174.

The conveyor 43 comprises a suitable frame 180 including side plates 182 joined together in any suitable manner that journal rollers 184 that support the belt conveyor 47 and are mounted on support 45. Belt conveyor 47 is driven by a suitable electric motor 186 that drives the conveyor end pulley through suitable pulley belt 188. Conveyor 43 projects forwardly, beyond frame 72 a distance on the order of two mail bag lengths, and is relatively thin in vertical depth so that several tiers of mail bags may be applied thereto as shown in FIGURES 1 and 2 and discharged onto underlying tiers without dropping the bags any great distance (assuming platform 45 is positioned accordingly). For this purpose the conveyor 43 should have a thickness no greater than about one-half the depth of a loaded mail bag as it lies in a horizontal position.

The elevating mechanism 74 in the form shown comprises two spaced apart pairs 189 of scissors type or cross levers 190 and 192 which have their ends 194 and 196 respectively pivoted to the platform 45 as at 195 and 197, and their other ends 198 and 200 pivotally connected, as at 201 and 203, respectively, to plates 205 and 207 that are respectively secured to nut devices 209 and 211 that are respectively actuated by opposedly threaded screw members 213 and 215 suitably journalled in place on frame 72 driven by motor 217 through pulley chain 219. Nut devices 209 and 211 when drawn together raise platform 45 from a position of rest on abutments 221 of frame 72. Movement of the nut devices in the opposite direction returns the platform 45 to a position of rest on said abutments 221.

Conveyor 38 of the embodiment of FIGURES 1 and 2 is in the form of a frame 202 including side members 204 and 206 in which are journalled the rollers 208 that support the belt conveyor 39. Belt conveyor 39 is driven by a suitable electric motor (not shown) adjacent the conveyor rearward end pulley and driving same through a pulley belt or the like. Conveyor 38 is on the loading dock on a suitable frame (not shown) of the general type suggested in my said application.

The bridge plate 174 may be secured in its illustrated operating position in any suitable manner, as by employing latch bars or the like (not illustrated).

The lazy tong linkage 120 is in the form of a plurality of interconnected levers 260 pivotally connected as at 262 and 264, in which one end 265 of the lazy tongs is pivotally connected to the carriage 40C, as at 266.

The lazy tong 120 at its other end 267 is pivotally connected as at 268 to a pair of nut members 270 cooperating with a screw shaft 272 driven by motor 274 (through pulley belt or chain 273 and suitable pulleys) for purposes of extending and contracting the lazy tongs. The shaft 272 is journalled in suitable bearing devices 275 and is threaded to move the nut devices 270 toward each other in one direction of rotation to extend the lazy tongs, and to move the nut devices in the opposite direction to retract the lazy tongs and thus move carriage 40 between its extended and retracted positions. Bearing devices 275, which may be of the pillow block type, and motor 274 are mounted on upper mounting plate 277 resting on support 279 and mounted for adjustment laterally of the path of movement of carriage 40 by adjusting clamp cap nuts 281 that cooperate with threaded studs extending through slots 285 formed in plate 277. Conveyor 38 is disposed in its illustrated inclined position to provide spaced for motor 274 and permit the rearward end 52 of carriage 40 to be disposed under end 54 thereof for ready transfer of the mail bags from conveyor 38 to carriage 40. The rearward end (not shown) of conveyor 38 should be low enough so that the bags can be conveniently lifted from dock surface 16 and applied to belt 39 to form the indicated bag tiers.

Linkage 120 and its actuating mechanism makes it possible to move carriage 40 with great speed and power between its load receiving and discharging positions, while maintaining complete control over the position and movement of the carriage mail bag load.

The operation and movements of the conveyors and bag carrying carriage are preferably controlled from a control panel 35, or the like, located outside of the vehicle, through any suitable wiring arrangement that incorporates the various motors and switches that have been referred to, and ordinarily only a single operator will be needed to both load the bags on the dock supported conveyor 38 and operate the machines involved to deposit the bags in the vehicle 14. The machines involved can readily be controlled to avoid dropping the bags further than the 24 inch limitation prescribed by the Post Office Department.

As is also disclosed in my said application Ser. No. 694,151 the bags 14 may also be loaded onto the conveyor 38 to form load units in different patterns of orientation; that is, instead of the bags 14 extending longitudinally of the vehicle, the bags may be disposed to extend transversely of the vehicle or at random but closely spaced positions with respect to each other, which relative positions are maintained during further handling of the bags by operating the conveyor 38, carriage 40 and its conveyor 43 in the manner already suggested to deposit the bags in stacks on the floor of the vehicle, except that the individual bag layers making up the stacks are laid down during a continuous rearward movement of the carriage 40 with respect to the vehicle at a rate equivalent to the discharging speed of the load support 43. The initial positioning and orientation of the bags in all forms of the invention is the indicated closed spaced relation to obtain maximum utilization of available storage space within the vehicle when fully loaded as herein disclosed.

The bag stacking arrangement of this invention will load trucks and trailers in a fraction of the time now required and at less than half the cost, while at the same time greatly reducing the effort required by workers handling the bags. This not only greatly reduces the tie up time for each truck, but also significantly reduces the over-all cost of mail bag handling.

While the herein disclosed specific embodiment and method are concerned with the loading of the mail bags into the highway vehicle in such a manner that the bags will extend longitudinally of the vehicle, this feature is optional though preferred as it comports with the way the bags are oriented in their final loaded position following the manual and semi-manual conventional procedures that have heretofore been referred to. However, the loading arrangements suggested by FIGURES 19–21 of my said application achieve the same objects insofar as compactness of loading is concerned, and the random positioning of FIGURES 19 and 20 of said application is preferable where the bags vary widely in size throughout the load. As to all described embodiment and methods herein disclosed, the load units or tiers formed on the loading dock are termed "partial transport vehicle load depth unit" in the appended claims.

The foregoing description and the drawings are given merely to explain and illustrate my invention since those skilled in the art who have my disclosure before them will be able to make modifications and variations therein without departing from the scope of the invention.

I claim:

1. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:
   a conveyor mounted on the loading dock adjacent but spaced from the load receiving position of the vehicle,
   said conveyor being positioned to be aligned with the vehicle and its end opening in the load receiving position of the vehicle,
   said conveyor presenting an upwardly facing load transporting surface at an elevation for convenient manual lifting of the bags from the dock onto the conveyor surface,
   said surface being proportioned transversely of the conveyor to accommodate a plurality of bags loaded thereon and oriented to extend longitudinally of the conveyor and in side-by-side tier forming relation,
   a mail bag receiving carriage positioned to operate between said conveyor and the load receiving position of the vehicle and proportioned to enter said vehicle end opening,
   said carriage riding on the loading dock when on same and riding on the vehicle load receiving area when moved within the vehicle,
   said carriage including a load supporting surface approximating the width of said conveyor surface,
   means for moving said carriage between a rearward mail bag receiving position adjacent said conveyor wherein the tier of bags formed on said conveyor may be discharged onto said carriage at the rear end thereof, and forward predetermined mail bag discharging positions within the vehicle wherein the tier is discharged from the forward end thereof at which time the rear end of the carriage is out of bag receiving relationship to the conveyor,
   said moving means comprising:
      lazy tong linkage mounted at one end thereof on the loading dock and having the other end thereof operably connected to said carriage,
      and means for extending and contracting said lazy tong linkage to move said carriage between said positions thereof,
   means for adjusting vertically said carriage load supporting surface to adjust same to receive the tier from said conveyor and discharge the tier at selected positions of elevation so as to form a mail bag stack on the vehicle load receiving area,
   and means for discharging the tier from said carriage surface,
   whereby the tier of mail bags may be mechanically transferred between said conveyor surface and the stack while maintaining said orientation.

2. The apparatus set forth in claim 1 wherein said means for extending and contracting said linkage comprises:
   a nut device secured to opposed arm ends of said linkage at said one end thereof,
   screw means operably engages said nut devices,
   and power means for reversibly rotating said screw means to extend and contract said linkage.

3. The apparatus set forth in claim 1 wherein said carriage load supporting surface comprises:
   a conveyor including endless conveyor means,
   and means for driving said conveyor to discharge the mail bag tier carried thereby.

4. The apparatus set forth in claim 3 wherein said carriage includes a wheeled frame, and wherein:
   said carriage load supporting surface vertically adjusting means comprises a crossed lever device comprising crossed lever arms operably connected between said frame and said conveyor,
   and including drive means for operating said crossed lever device to raise and lower said conveyor.

5. The apparatus set forth in claim 4 wherein said conveyor of said carriage projects forwardly of said wheeled frame a distance on the order of two mail bag lengths and has a vertical dimension that is substantially less than the width of a filled mail bag.

6. In bulk mail handling apparatus for loading elongated mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:
   a conveyor mounted on the loading dock adjacent but spaced from the load receiving position of the vehicle,
   said conveyor being positioned to be aligned with the vehicle and its end opening in the load receiving position of the vehicle,
   said conveyor presenting an upwardly facing load transporting surface at an elevation for convenient manual lifting of the bags from the dock onto the conveyor surface,
   said surface being proportioned transversely of the conveyor to accommodate a plurality of bags loaded thereon and oriented to extend longitudinally of the conveyor and in side-by-side tier forming relation,
   a mail bag receiving carriage positioned to operate between said conveyor and the load receiving position of the vehicle and proportioned to enter said vehicle end opening,
   said carriage riding on the loading dock when on same and riding on the vehicle load receiving area when moved within the vehicle,
   said carriage including a load supporting surface approximating the width of said conveyor surface,
   means for moving said carriage between a rearward mail bag receiving position adjacent said conveyor wherein the tier of bags formed on said conveyor may be discharged onto said carriage at the rear end thereof, and forward predetermined mail bag discharging positions within the vehicle wherein the tier is discharged from the forward end thereof at which time the rear end of the carriage is out of bag receiving relationship to the conveyor, said moving means comprising:
 extensible and contractable means mounted at one end thereof on the loading dock and having the other end thereof operably connected to said carriage,
 and means for extending and contracting said extensible and contractable means to move said carriage between said positions thereof,
 means for adjusting vertically said carriage load supporting surface to adjust same to receive the tier from said conveyor and discharge the tier at selected positions of elevation so as to form a mail bag stack on the vehicle load receiving area,
 and means for discharging the tier from said carriage surface,
 whereby the tier of mail bags may be mechanically transferred between said conveyor surface and the stack while maintaining said orientation.

References Cited

UNITED STATES PATENTS

| | | | |
|---|---|---|---|
| 2,107,569 | 2/1938 | Hamlin | 214—41 |
| 2,186,463 | 1/1940 | Maine | 214—38 |
| 2,208,208 | 7/1940 | Brooks | 214—41 X |
| 2,870,922 | 1/1959 | Thomson | 214—6 |
| 2,993,610 | 7/1961 | Kughler. | |
| 3,337,066 | 8/1967 | Reed et al. | 214—38 |
| 3,373,882 | 3/1968 | Forest | 214—6 |

GERALD M. FORLENZA, Primary Examiner

ROBERT J. SPAR, Assistant Examiner

U.S. Cl. X.R.

214—730, 41